March 28, 1933.  H. HARPER  1,903,111
COFFEE MAKING MACHINE
Filed Dec. 8, 1930
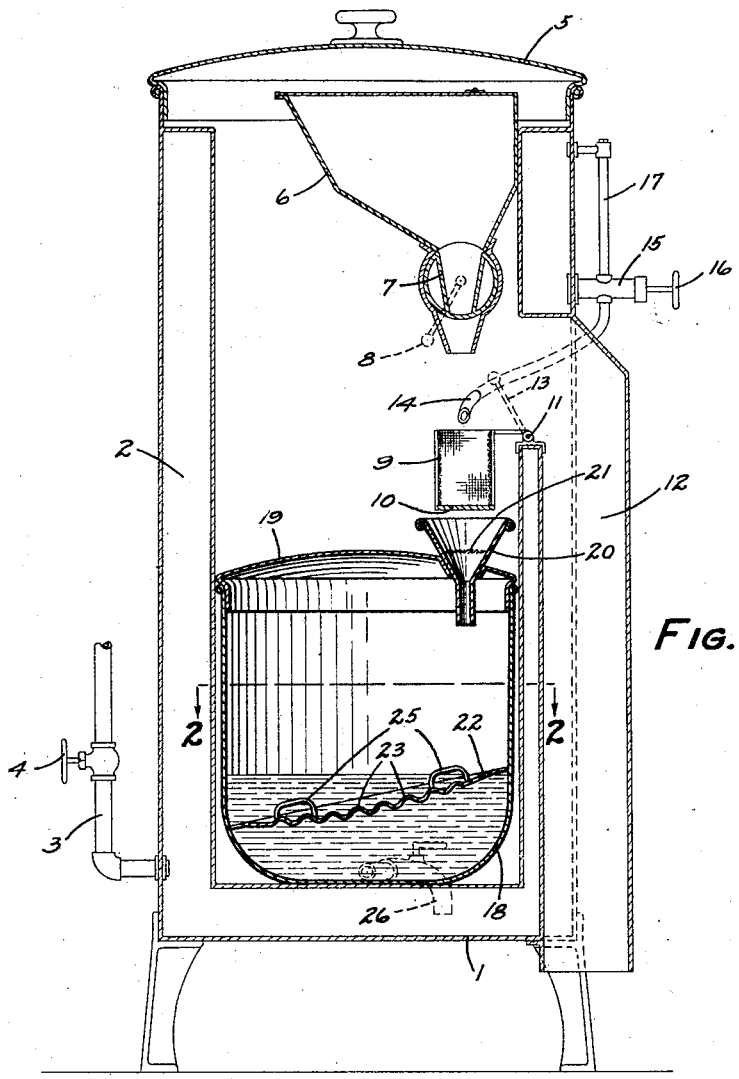
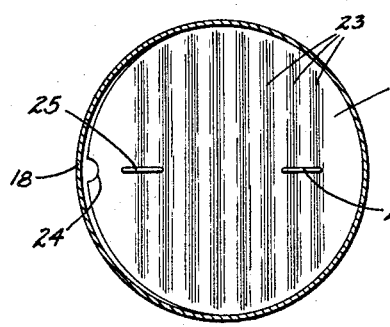
INVENTOR
HARRY HARPER
BY Paul, Paul & Moore
ATTORNEYS Patented Mar. 28, 1933

1,903,111

UNITED STATES PATENT OFFICE

HARRY HARPER, OF MINNEAPOLIS, MINNESOTA

COFFEE MAKING MACHINE

Application filed December 8, 1930. Serial No. 500,846.

Coffee making machines now quite generally in use include at least two features which are known to nearly all machines of this character, namely, a coffee making mechanism and a coffee service receptacle. Coffee is usually made in the coffee making mechanism by causing hot water to flow more or less rapidly through a receptacle containing fresh ground coffee. The infusion thus made enters either directly or is conducted by other means to the coffee service receptacle from which the prepared coffee is served.

In machines of the character described, the operator does not wait for the coffee in the service receptacle to be exhausted before a fresh charge of liquid coffee is made; in fact, there is usually a quantity of coffee left in the service receptacle when the fresh charge of liquid coffee is introduced thereinto. The result is that the fresh coffee mixes with the old and this is a great disadvantage. The first part of the fresh charge of liquid coffee is usually very strong and black and when mixed with the residue of the previous charge will make the total mixture too strong and dark to be served. Moreover, the fresh coffee is given no opportunity to age properly before it is served and it is generally conceded that age is essential in the making of good coffee.

It is, therefore, the primary object of the present invention to provide a coffee receptacle for coffee making machines having means for temporarily separating a fresh charge of liquid coffee from the residue of a previous charge remaining in the receptacle.

It is another object of the invention to provide a coffee receptacle with means for separating a fresh charge of liquid coffee from the residue of a previous charge thereby to permit the fresh charge to become thoroughly mixed before it is further mixed with the old coffee in the receptacle.

A further object is to provide a coffee receptacle with means which will break the force of coffee falling into the receptacle thereby to prevent, temporarily, the admixture of the old and new coffee.

Other objects of the invention and the advantages thereof will more fully appear as the description proceeds.

In the accompanying drawing I have illustrated a practical embodiment of my invention; but it is to be understood that the drawing is illustrative, merely, and that I do not intend that the invention shall be confined to the details of construction therein shown. It will be readily apparent that my inventive concept may be embodied in a variety of forms without departing from the scope of the invention as defined in the appended claims.

In the drawing:

Fig. 1 is a view in vertical section of a coffee making machine embodying my invention; and Fig. 2 is a sectional view taken on line 2—2 of Fig. 1.

Referring now to the drawing, the reference numeral 1 indicates a coffee making machine or urn which is provided with a water jacket 2. Hot water may be introduced into the water jacket through a suitable pipe 3 provided with a control valve 4.

The urn is provided with a cover 5 beneath which is located a hopper 6 adapted to contain a quantity of fresh ground coffee. The lower end of the hopper 6 is provided with a measuring device 7 so constructed and arranged that a predetermined quantity of ground coffee may be discharged from the hopper 6 by manipulation of a handle 8 projecting to the exterior of the machine.

The fresh ground coffee discharged from the hopper 6 is introduced into what I shall call a filtration precipitant receptacle 9. This receptacle may have an imperforate bottom 10 and sides formed of screen or other foraminated material. The receptacle 9 is hinged as at 11 for swinging movement so that the contents thereof, when the grounds have been spent, may be discharged into a chute 12 formed in the side of the machine or urn. The chute 12 is open at the bottom and any suitable receptacle may be placed beneath the chute to catch the spent coffee grounds discharged from the receptacle. A suitable handle 13 is provided upon the outside of the machine for swinging the receptacle 9 about the pivot 11.

When the required quantity of ground coffee has been introduced into the receptacle 9, a predetermined quantity of hot water is made to flow therethrough at a predetermined rate of speed. The hot water is introduced through a suitable pipe 14 which communicates through a coupling member 15 with the water jacket 2. If desired a shut-off valve 16 may be provided to prevent flow of hot water through the pipe 14. However, in practice this will not be necessary because when it is desired to make a fresh charge of coffee, the valve 4 will be opened to admit the desired quantity of water into the jacket. A suitable gauge 17 will indicate to the operator when the predetermined quantity of water has been introduced into the jacket and this quantity may be permitted to flow by gravity through the tube 14.

The foregoing details of construction may be varied at will without in any way affecting my invention which will now be described in detail.

I have provided a coffee service receptacle indicated by the reference numeral 18 which, for convenience, may rest upon the bottom of the urn, as clearly shown in Fig. 1. This receptacle may be made of any desired material, that is to say, it may be made of crock, of glass, or of suitable non-corroding metals, such for example, as Monel metal. The receptacle 18 is provided with a tight fitting cover 19 which will prevent the escape of steam from the receptacle and will thus aid to preserve the natural aroma and flavor of the coffee which in many machines now in use are permitted to pass off with steam from the receptacle.

In the cover 19 I have mounted a suitable funnel 20 which is located in alignment with the receptacle 9. If desired the funnel 20 may be provided with a screen 21 as an additional safeguard against the passage of sediment into the receptacle 18.

As above stated the principal feature of my invention resides in the provision of means within the coffee service receptacle which will separate a fresh charge of liquid coffee from the residue of a previous charge remaining in the receptacle. In the present embodiment of the invention, and as disclosed in the drawing, this means consists of a partition indicated by the reference numeral 22 which is supported at an angle to the vertical within the said receptacle. It will be understood that in order so to support the said partition its contour will be somewhat elliptical when the receptacle 18 is cylindrical in form. The said partition 22 is slightly concave, as clearly shown in Fig. 1, and is provided with corrugations 23 which serve to accumulate any sediment which may have passed into the receptacle and prevent the passage of such sediment into the portion of the receptacle below the said partition.

The partition 22 is provided at its lower edge with a cut-out or recess 24 which forms with the wall of the receptacle 18 an aperture through which coffee may pass from the space above the said partition to the space below the same.

It is not necessary for the purposes of my invention that the partition 22 shall fit tightly against the inner wall of the receptacle 18. Nor, as above pointed out, is it necessary that the said partition shall be of any particular form. For example, if the receptacle be of rectangular configuration the partition will conform to such shape. Other forms may be adopted as will be well understood.

In order that the partition 22 may be removed for cleaning when required it is provided with suitable handles 25.

A faucet 26 communicates with the receptacle 18 so that coffee may be withdrawn from the said receptacle when desired.

The partition 22 performs the useful functions hereinbefore set forth. It serves to separate a succeeding charge of fresh liquid coffee from the residue of a previous one remaining in the receptacle. It permits the entire charge of fresh liquid coffee to mix above the said partition before the fresh charge mixes with the old coffee below the partition. Moreover, the partition serves to break the force of the fresh coffee as it falls into the receptacle and permits the said fresh coffee to flow slowly downward thus effectually overcoming any turbulence which would ordinarily occur to produce a rapid and intimate mixture of the fresh coffee with the old.

In the operation of the machine as thus described, a quantity of fresh ground coffee is first introduced into the receptacle 9. At this time, it will be understood, there still remains in the receptacle 18 a certain quantity of old coffee previously made. In practice, it will be best to make the fresh coffee while there is sufficient of the old coffee left to serve the usual requirements. In other words, fresh coffee may be introduced at a time when, say for convenience, a gallon of old coffee remains in the receptacle 18. When the ground coffee has been placed in the receptacle 9, the requisite quantity of hot water is made to flow through the pipe 14 and downwardly through the coffee in the receptacle 9. The flow of the hot water will be gradual but may be regulated within any desired limits. For example, if a gallon of hot water is to be used with a given quantity of ground coffee in the receptacle 9, this gallon may be made to flow during a period of two minutes, or five minutes, or ten minutes, whichever may be determined to be the proper rate of flow to produce any desired strength and quality of coffee.

As the hot water passes through the ground coffee in the receptacle 9, it absorbs the good qualities of the coffee and passes out through the sides of the said receptacle and into the funnel 22 by which it is introduced into the receptacle 18.

As is well known, the first coffee produced by the foregoing process will be strong and black and quite unfit to serve. If, however, the quantity of water and the quantity of ground coffee have been properly correlated, when all of the water has passed through, the result will be coffee of desired strength and flavor. Hence, while the first coffee is strong and black, succeeding quantities will be lighter in color and weaker. These succeeding quantities should be permitted to mix with the first quantity in order to produce a uniform mixture.

This desirable result is accomplished by my invention in the manner above described. That is to say, when the first portion of the fresh liquid coffee, which is strong and black, enters the receptacle 18, it is prevented by the partition 22 from mixing with the remaining quantity of old coffee in the receptacle. Hence, the full charge of fresh liquid coffee is retained above the partition 22 for a sufficient length of time to permit said fresh coffee thoroughly to mix to produce coffee of required strength, color and flavor. There will be a gradual diffusion through the opening 24 but this will not be sufficient to permit rapid and untimely mixture of the fresh coffee with the old. Thus, the fresh coffee is also afforded opportunity to age slightly before it is served and this is a requirement of good coffee.

The position of the partition 22 with respect to the height of the receptacle 18 may be varied at will in accordance with requirements. For example, if a large quantity of coffee ready to serve must be at hand at all times, the partition 22 will be spaced a relatively great distance from the bottom of the receptacle so as to provide space for the required quantity of coffee. If, on the other hand, only a small quantity of coffee is required for service, the partition will be closer to the bottom of the receptacle.

It is believed that the foregoing description will make my invention entirely clear and that the many advantages thereof will be readily appreciated. Obviously, modifications may be made in the form of the partition and the associated elements without departing from the spirit of the invention.

I claim as my invention:

1. In a coffee making machine, a receptacle adapted to receive successive charges of fresh liquid coffee, and a removable partition in said receptacle spaced from the bottom thereof and normally immersed in said liquid coffee for temporarily separating a succeeding charge from the residue of a previous charge remaining in said receptacle, said partition having an unrestricted aperture therein establishing communication between the space in said receptacle above said partition and the space below the same.

2. In a coffee making machine, a receptacle adapted to receive successive charges of fresh liquid coffee, and a removable corrugated angularly disposed partition in said receptacle normally immersed in said liquid coffee for temporarily separating a succeeding charge of coffee from a previous charge remaining in the receptacle.

3. In a coffee making machine, a receptacle adapted to receive successive charges of fresh liquid coffee, and a removable corrugated apertured partition in said receptacle for retarding the admixture of a succeeding charge with a previous one while permitting gradual diffusion of said succeeding charge into said previous charge, said partition being normally partially immersed in said liquid coffee.

4. In a coffee making machine, a receptacle provided with a cover, means in said cover for the introduction into said receptacle of successive charges of fresh liquid coffee, and a removable partition angularly disposed within said receptacle and spaced from said cover for breaking the force of a charge of coffee entering the said receptacle, said partition being provided with an aperture at its lower end and said lower end of said partition being normally immersed in said liquid coffee.

In witness whereof, I have hereunto set my hand this 4th day of December, 1930.

HARRY HARPER.